(12) United States Patent  
Chiba

(10) Patent No.: US 7,155,063 B2  
(45) Date of Patent: Dec. 26, 2006

(54) IMAGE PROCESSING APPARATUS AND METHOD OF CONTROLLING SAME

(75) Inventor: Yukio Chiba, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 776 days.

(21) Appl. No.: 10/369,544

(22) Filed: Feb. 21, 2003

(65) Prior Publication Data

US 2003/0161538 A1 Aug. 28, 2003

(30) Foreign Application Priority Data

Feb. 22, 2002 (JP) ............................ 2002-046436

(51) Int. Cl.
*G06K 9/36* (2006.01)
(52) U.S. Cl. ................................... 382/233
(58) Field of Classification Search ........ 382/232–236, 382/238–250; 341/94; 348/425.2, 425.4, 348/434.1, 435.1; 358/426.09, 426.1, 426.12, 358/426.13

See application file for complete search history.

(56) References Cited

U.S. PATENT DOCUMENTS 5,548,340 A * 8/1996 Bertram ...................... 348/559
5,801,785 A * 9/1998 Crump et al. ................ 348/563
2002/0090142 A1 7/2002 Igarashi et al. ............. 382/246
2002/0122599 A1 9/2002 Igarashi et al. ............. 382/239
2002/0154042 A1 10/2002 Igarashi et al. ............... 341/67
2002/0164080 A1 11/2002 Igarashi et al. ............. 382/233

* cited by examiner

*Primary Examiner*—Jose L. Couso
(74) *Attorney, Agent, or Firm*—Fitzpatrick, Cella, Harper & Scinto

(57) ABSTRACT

An image processing apparatus, and a method of controlling the same, for making it possible to execute decoding of compressed image data appropriately, in a processing time needed for decoding that will not detract from user convenience, and in conformity with amount of code error contained in the image. An encoded data input signal has its header information analyzed by a header information processor, which outputs an encoding-parameter output signal. The image information of the encoded data input signal is decoded by a variable-length code decoder, which produces an output signal that is a series of orthogonal transformation coefficient sequences. These two output signals are input to a image data reconstruction unit, which reconstructs the image data. If the encoded data input signal contains a code error, then the encoded data input signal is corrected using correction data. The correction data for correcting the encoded data input signal is decided based upon the number of detection of code errors.

11 Claims, 6 Drawing Sheets

IMAGE PROCESSING APPARATUS AND METHOD OF CONTROLLING SAME

FIELD OF THE INVENTION

This invention relates to an image processing apparatus for decoding compressed image data. More particularly, the invention relates to an image processing apparatus, and to a method of controlling the same, for subjecting compressed image data containing an encoding error to processing in such a manner that an image closer to the original image can be reconstructed in excellent fashion.

BACKGROUND OF THE INVENTION

The JPEG scheme, which has been standardized by the ISO (International Standardization Organization), has been in widespread use as an encoding scheme for storing and displaying still images on a recording medium such as a CD-ROM or hard disk. Further, the MPEG scheme standardized by the ISO has been in wide use as an encoding scheme of moving images for similarly storing and displaying moving images on a recording medium and either broadcasting these images via a communication path or transmitting them bi-directionally.

When image encoding is performed in both the JPEG and MPEG schemes, an encoded data stream is generated. The data stream comprises a header and an image data portion. The header includes information that is necessary for decoding an image, such as size of the image, number of color components constituting the image and sampling coefficient values for every color component. The image data portion is image data that is the result of entropy encoding by variable-length encoding.

With block interleaving that repeatedly encodes color components every block of 8×8 pixels in such an encoded data stream, the term "minimum coded unit" (MCU) is used to refer to the smallest unit in a case where blocks of all color components have been encoded based upon sampling coefficients. For example, in the case of an image in which color components are luminance Y and color differences Cb and Cr and the sampling coefficients are 2:1:1, respectively, one MCU is composed of four blocks of (Y, Y, Cb, Cr).

A re-synchronization identifier referred to as a "restart marker" can be inserted into an encoded data stream at any intervals using the MCU as the unit. If an encoded data stream that contains an error for some reason is decoded, the effects of the error can be kept within the limits of the re-start marker interval. It is stipulated that the restart markers be present at the byte boundaries in the encoded data stream. If an encoded data stream immediately prior to insertion of the restart marker does not end at the byte boundary, the restart marker is inserted following insertion of a plurality of "1"s of one to seven bits referred to as "parity bits".

If an encoded data stream that contains a code error for some reason is decoded, much of the code error is detected as a result of either of the following phenomena:

(1) detection of a variable-length code that does not exist in a conversion table used at the time of encoding; or (2) detection of 64 or more variable-length codes in one block.

If restart markers have been inserted into an encoded data stream, it is possible to search for the encoded data stream starting from the location at which the error code was detected and decoding can be resumed from the location at which the next restart marker appears. By inserting compensation data with regard to undecodable coded data between a location at which code error has been detected and a location at which a restart marker appears, it is possible to obtain a reconstructed image of identical size in which the numbers of horizontal and vertical pixels agree with those of the original image.

Even if a restart marker does not appear in an encoded data stream from the location of code error detection onward, inserting compensation data so as to satisfy the numbers of horizontal and vertical pixels of the original image will make it possible to obtain a reconstructed image in which at least the portion of the image that prevailed prior to detection of the error can be displayed.

However, in the conventional image processing apparatus, error compensation processing for finding a restart marker from an encoded data stream from the location of code error detection onward and inserting compensation data is not executed in the decoding of an encoded data stream that does not contain the usual code error. From the standpoint of cost, therefore, such an image processing apparatus generally is implemented as software on a microprocessor rather than as hardware. From the standpoint of processing speed, however, software implementation requires a longer processing time than hardware implementation.

Once code error has been detected in an encoded data stream composed of contiguous variable-length codes, it is necessary to examine the encoded data stream sequentially from the location of error code detection onward in order to ascertain to what degree error code is contained in the overall encoded data stream. Accordingly, in a case where much code error is dispersed in an image of large size, the examination cannot be made unless the four processes of code-error detection, restart-marker search, compensation and resumption of decoding are repeated. Among these four processes, the processing for restart-marker search and compensation generally implemented by software occupies the major part of the processing time required for overall decoding. As a consequence, a very long processing time is required for decoding. This detracts markedly from user convenience.

Further, the above-described problem becomes particularly pronounced in decoding processing of a moving image in which the number of images to be processed per unit time is stipulated.

SUMMARY OF THE INVENTION

The present invention has been proposed to solve the problems of the prior art and its object is to provide an image processing apparatus, and a method of controlling the same, for making it possible to execute decoding of compressed image data appropriately, in a processing time needed for decoding that will not detract from user convenience, in conformity with amount of code error contained in the image.

According to the present invention, the foregoing object is attained by providing an image processing apparatus comprising; header information processing means for analyzing header information in an entered encoded data stream; decoding means for successively decoding image information, which comprises a plurality of successive variable-length codes of the encoded data stream, thereby obtaining a series of frequency transform coefficient sequences; reconstructing means for reconstructing image data based upon encoding parameters and the series of frequency transform coefficient sequences; detection means for detecting code errors contained in the encoded data stream of an entered block; counting means for counting the number of code errors detected; search means for searching for resync identifiers contained in the encoded data stream; and correction means which, if the number of code errors detected is equal or less than a predetermined number and, moreover, a code error is contained in a portion of the data stream that lies between two resync identifiers that have been found, corrects this portion of the data stream by a correction data stream, and if the number of code errors detected is greater than the predetermined number, corrects the encoded data stream by a correction data stream having a size the same as that of reconstructing entire image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

A preferred embodiment of the present invention will now be described in detail in accordance with the accompanying drawings.

Figure 1:
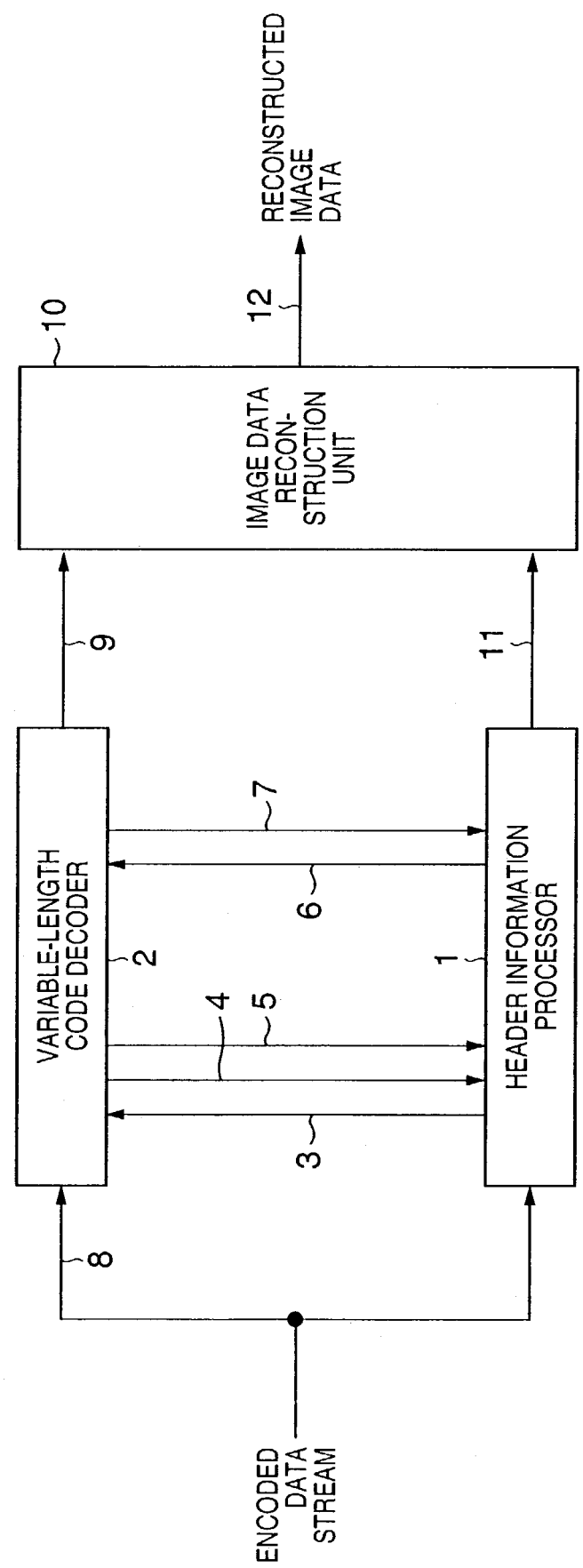
FIG. 1 is a block diagram useful in describing the functions of an image processing apparatus to which an embodiment of the present invention is applied.

FIG. 1 is a block diagram useful in describing the functions of an image processing apparatus to which an embodiment of the present invention is applied. As shown in FIG. 1, the apparatus includes a header information processor 1 as constituted by a general-purpose microprocessor that operates in accordance with program code. The header information processor 1 serves as means for analyzing header information contained in an entered encoded data stream and obtaining encoding parameters. The apparatus further includes a variable-length code decoder 2 for successively decoding image information comprising a plurality of successive variable-length codes of the entered encoded data stream and obtaining a series of frequency transform coefficient sequences, and an image data reconstruction unit 10 for reconstructing image data based upon the encoding parameters and the series of frequency transform coefficient sequences.

Reference numeral 3 denotes an operation-start command signal that is output from the header information processor 1, and reference numerals 4, 5 denote an operation-end notification signal and a code-error detection notification signal, respectively, output from the variable-length code decoder 2. Furthermore, reference numeral 6 denotes a compensating-data write signal that enters from the header information processor 1, and reference numeral 7 denotes an encoded-data output signal that is output from the variable-length code decoder 2.

Furthermore, reference numeral 8 denotes an encoded data stream input signal that is input to the header information processor 1 and variable-length code decoder 2, reference numeral 9 denotes an output signal, which is a series of orthogonal transformation coefficient sequences, applied from the variable-length code decoder 2 to the an image data reconstruction unit 10, reference numeral 11 denotes an encoding-parameter output signal applied from the header information processor 1 to the an image data reconstruction unit 10, and reference numeral 12 denotes a reconstructed image data output signal from the an image data reconstruction unit 10.

Reference will now be had to the drawings to describe a series of operations relating to decoding processing using the image processing apparatus having the above-described structure, as well as the control flow between header information processor 1 and variable-length code decoder 2.

Figure 2:
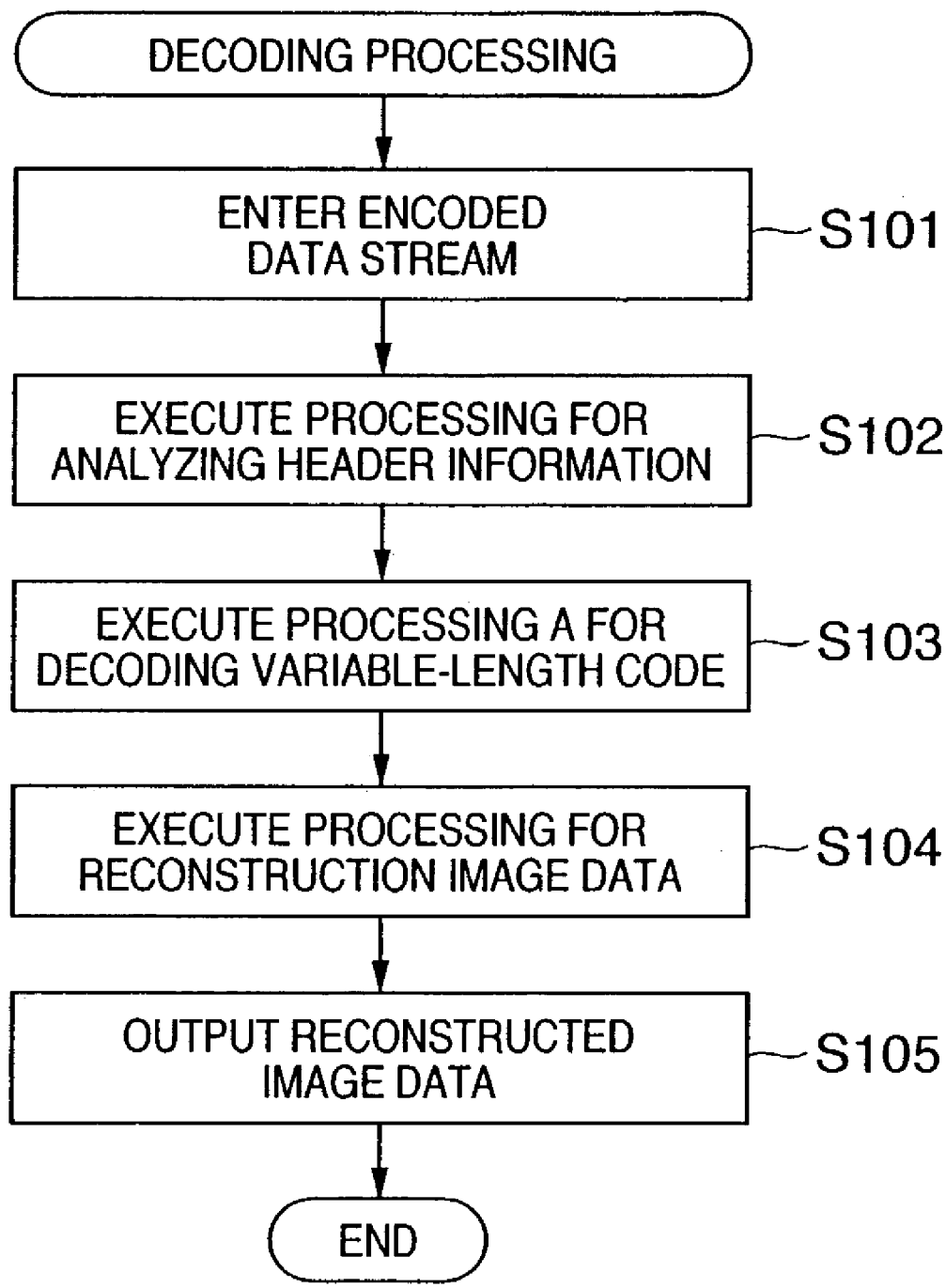
FIG. 2 is a flowchart useful in describing decoding processing in the embodiment of the image processing apparatus shown in FIG. 1.

Normal encoding processing for a case where encoding error is not detected in an encoded data stream will be described first with regard to the drawings. FIG. 2 is a flowchart useful in describing decoding processing in the embodiment of the image processing apparatus shown in FIG. 1.

As shown in FIG. 1, an encoded data stream that has entered via the encoded data stream input signal 8 is provided to both the header information processor 1 and variable-length code decoder 2 (step S101). The header information processor 1 reads the header information, which is contained in the encoded data stream, out of the encoded data stream input signal 8 by an internal program, analyzes the content of this information, thereby obtaining encoding parameters, and outputs the parameters to the image data reconstruction unit 10 via the encoding-parameter output signal 11 (step S102). The header information processor 1 then executes processing A for decoding variable-length code (step S103).

Figure 3:
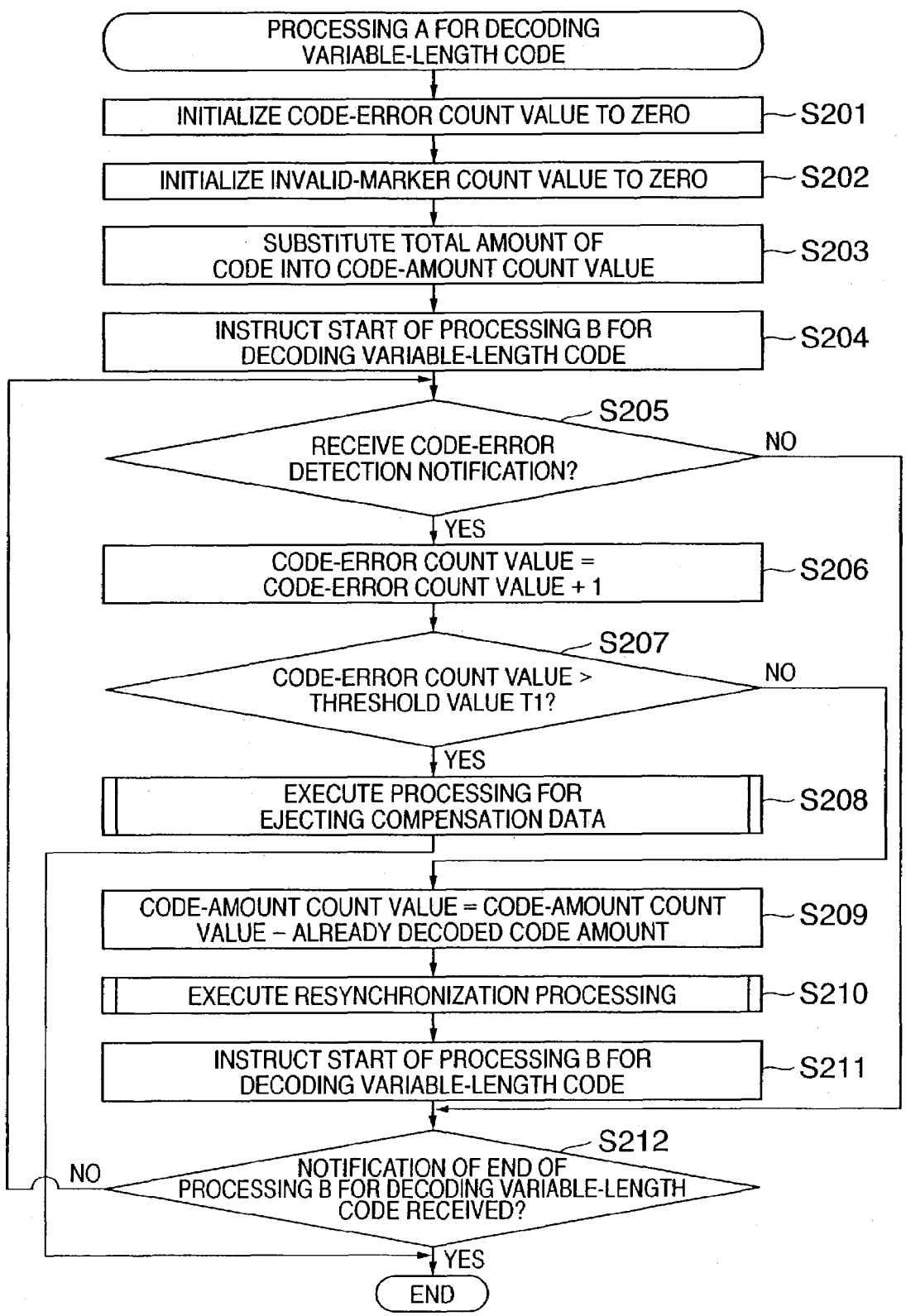
FIG. 3 is a flowchart useful in describing the details of processing for decoding variable-length code executed by a header information processor.

FIG. 3 is a flowchart useful in describing the details of processing A for decoding variable-length code executed by the header information processor 1. Using registers or memories, etc., the header information processor 1 internally stores a code-error count value obtained by counting the number of code errors that appear in an encoded data stream, an invalid-marker count value obtained by counting the number of invalid identifiers (markers) that appear in an encoded data stream, and a code-amount count value obtained by counting the amount of unprocessed code in the overall amount of code to be decoded.

When processing A for decoding variable-length code is executed, the header information processor 1 initializes the error-code count value to zero (step S201) before the start of decoding processing by the variable-length code decoder 2. Similarly, the header information processor 1 initializes the invalid-marker count value to zero (step S202). Further, the header information processor 1 substitutes the total amount of code to be decoded into the code-amount count value (step S203).

If the ensuing code in the entered encoded data stream is a plurality of successive variable-length codes obtained by the variable-length encoding of image information, namely a series of orthogonal transform coefficient sequences, then the header information processor 1 instructs the variable-length code decoder 2 to start execution of processing B, which is for decoding variable-length code (step S204). The fact that the start of this operation has been instructed is reported to the variable-length code decoder 2 by the operation-start command signal 3 shown in FIG. 1.

Figure 4:
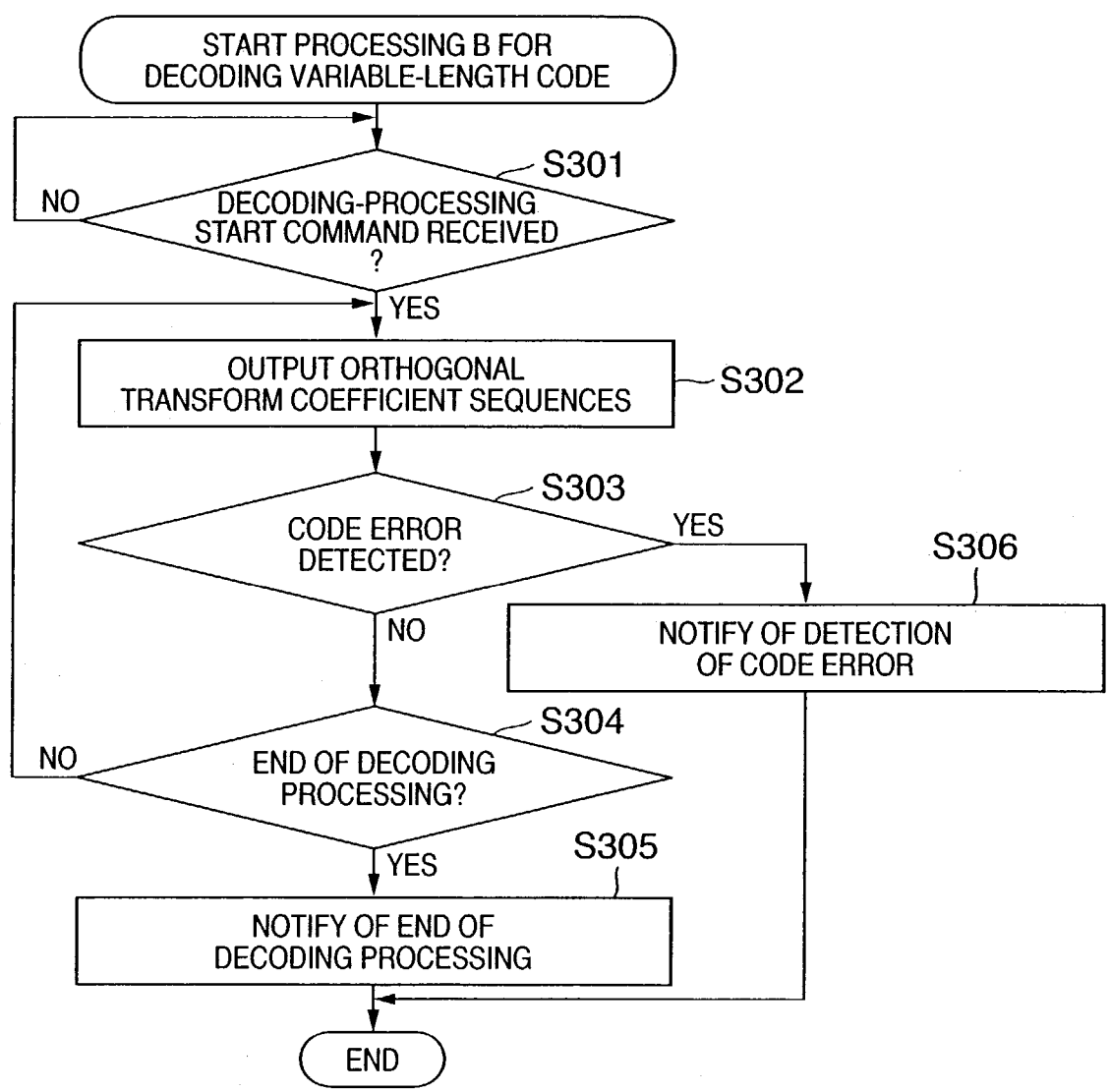
FIG. 4 is a flowchart useful in describing the operation of processing for decoding variable-length code executed by a variable-length code decoder.

FIG. 4 is a flowchart useful in describing the operation of processing B for decoding variable-length code executed by the variable-length code decoder 2. The variable-length code decoder 2 determines whether the operation-start command signal 3 has been received (step S301), this being the signal that commands the start of processing for decoding variable-length code. If it is determined that signal 3 has not been received ("NO" at step S301), then the variable-length code decoder 2 continues waiting for receipt of the signal.

When the operation-start command signal 3 has been received ("YES" at step S301), then the variable-length code decoder 2 reads the successive variable-length codes out of the encoded data stream input signal 8 one after another and, while referring to a separately provided variable-length code table, converts these variable-length codes successively to corresponding orthogonal transform coefficient sequences. The series of orthogonal transform coefficient sequences obtained as a result are output successively to the image data reconstruction unit 10 via the output signal 9 composed of orthogonal transform coefficient sequences (step S302).

It should be noted that the encoding parameters, which were used in the processing for converting the image data and are represented by quantization step values, are supplied successively from the header information processor 1 to the image data reconstruction unit 10 via the separate encoding-parameter output signal 11.

Next, the variable-length code decoder 2 determines whether code error has been detected (step S303). Since a case in which code error is not detected is being described here, a "NO" decision is rendered at step S303 and therefore processing for decoding variable-length code is applied to the entire encoded data stream that enters via the encoded data stream input signal 8. The variable-length code decoder 2 then determines whether decoding processing is finished (step S304). If the result of the determination is that decoding processing is finished ("YES" at step S304), then the variable-length code decoder 2 uses the operation-end notification signal 4 to notify the header information processor 1 of the fact that processing B for decoding variable-length code has ended (step S305). On the other hand, if it is determined that decoding processing is not yet finished ("NO" at step S304), then control returns to step S302 and the above-described processing is repeated.

Since a case in which code error is not detected is being described here, the header information processor 1 does not detect code error ("NO" at step S205) and determines whether notification of end of processing B for decoding variable-length code has been received from the variable-length code decoder 2 (step S212). If the result of the determination is that the operation-end notification signal 4 has been received ("YES" at step S212), then processing A for decoding variable-length code is exited (step S103). On the other hand, if the operation-end notification signal 4 has not been received ("NO" at step S212), then control returns to step S205 and the above-described processing is repeated.

The image data reconstruction unit 10 subjects the significant coefficients contained in the series of orthogonal transform coefficient sequences to scalar dequantization by separately designated quantization step values, whereby the orthogonal transform coefficients arrayed in a one-dimensional data stream in a prescribed order are returned to a two-dimensional array. An orthogonal inverse-transform operation is executed on a per-block basis to effect restoration to reconstructed image data of a rectangular block (S104). The finally reconstructed image data is output via the reconstructed image data output signal 12 (step S105).

Next, decoding processing for a case where code error has been detected in an encoded data stream will be described with reference to the drawings.

During execution of processing B for decoding variable-length code in the variable-length code decoder 2, the latter monitors code error at all times (step S303). If code error is detected ("YES" at step S303), then the variable-length code decoder 2 uses the code-error detection notification signal 5 to notify the header information processor 1 of the fact that code error has been detected (step S306).

If the code-error detection notification signal 5 from the variable-length code decoder 2 is received ("YES" at step S205), the header information processor 1 increments the code-error count value to count up the number of times code error has been detected (step S206).

The above processing is executed with regard to the entirety of the entered encoded data stream. The header information processor 1 determines whether the count of code errors is greater than a preset threshold value T1 (step S207). If the count of code errors is greater than a preset threshold value T1 ("YES" at step S207), then the header information processor 1 executes compensation-data ejection processing immediately (step S08).

Figure 5:
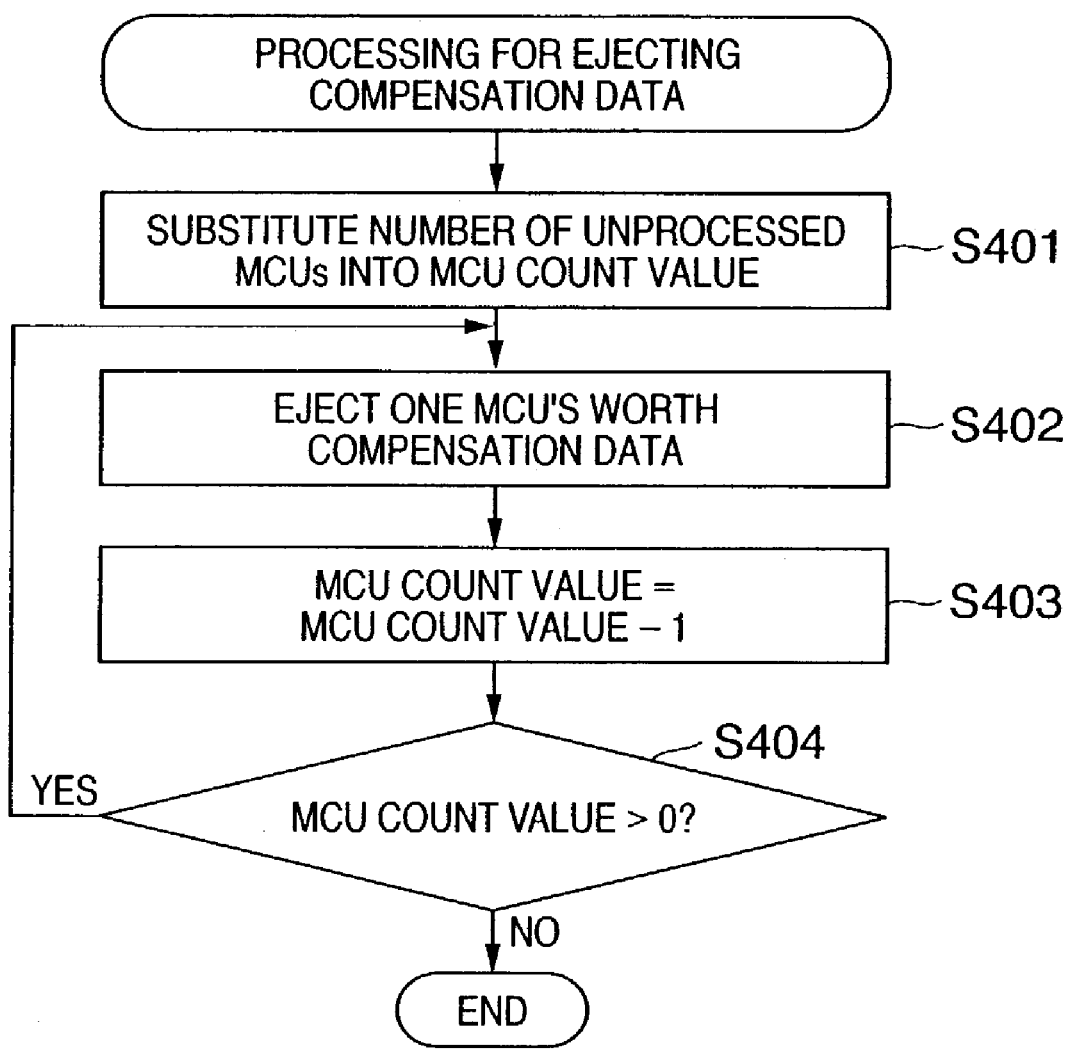
FIG. 5 is a flowchart useful in describing processing for ejecting compensation data in the header information processor.

FIG. 5 is a flowchart useful in describing processing for ejecting compensation data executed by the header information processor 1. In the processing of FIG. 5 for ejecting compensation data, the header information processor 1 substitutes the number of MCUs corresponding to the portion of the encoded data stream that has not undergone decoding processing into an MCU count value (step S401). Next, the header information processor 1 generates one MCU's worth of compensation data by an appropriate method, such as by fill-in using a prescribed single color or fill-in using the color of the very last pixel or by making color agree with the color of the periphery, and ejects this data to the variable-length code decoder 2 via the compensating-data write signal 6 (step S402). The header information processor 1 then decrements the MCU count to thereby count the number of MCUs remaining to be ejected (step S403). By repeating the above-described processing for ejecting compensation data until the MCU count becomes zero (step S404), compensation data that satisfies the number of horizontal pixels and number of vertical pixels of the original image is ejected to the variable-length code decoder 2.

The fact that the count of code errors takes on a large value reflects the fact that the degree of damage sustained by the encoded data stream is large. That is, with regard to an encoded data stream that has sustained so much damage that the count of code errors takes on a large value, it can be predicted that the probability that a normal restart marker (resync identifier) will appear again will be low even if a search for the restart marker is continued in the hope that it will reappear following the detection of code error. Furthermore, in a case where the search for this restart marker is conducted using the header information processor 1, which is constituted by a general-purpose microprocessor that operates in accordance with program code, the processing time is extremely long and user convenience suffers as a result. Accordingly, in the image processing apparatus of the present invention, an appropriate value is set for the threshold value T1. If the count of code errors exceeds this threshold value, processing for ejecting compensation data is executed immediately without conducting a further search for restart markers. This is a highly reasonable decision that takes user convenience into consideration.

On the other hand, if the count of code errors is found not to be greater than the preset threshold value T1 ("NO" at step S207) when code error is detected, then the header information processor 1 subtracts the amount of code that has undergone decoding processing from the code-amount count value, thereby counting the amount of unprocessed code of the encoded data stream (step S209). The header information processor 1 then executes re-synchronization processing utilizing the restart marker (step S210).

Figure 6:
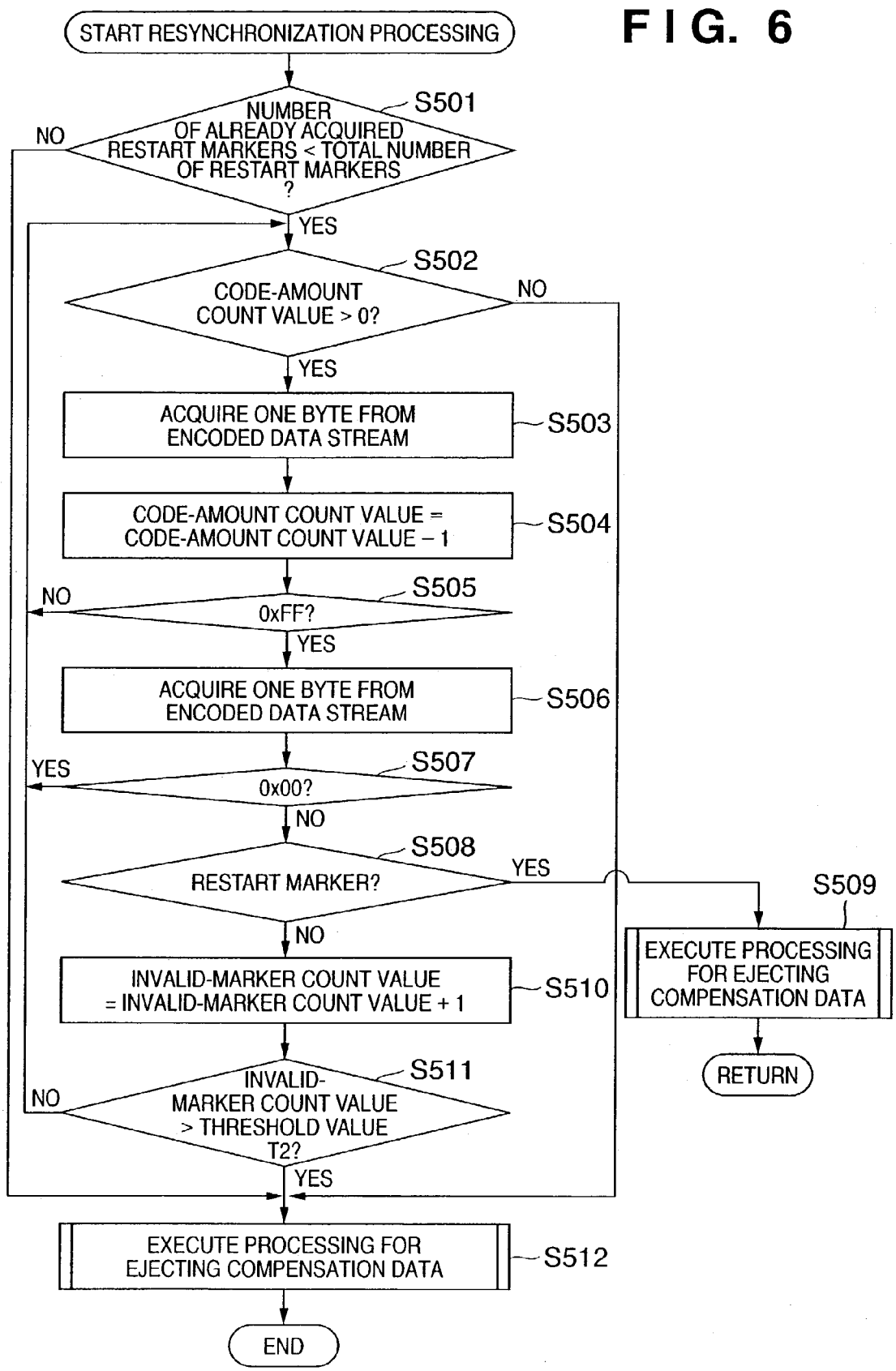
FIG. 6 is flowchart useful in describing re-synchronization processing executed by the header information processor.

FIG. 6 is flowchart useful in describing re-synchronization processing executed by the header information processor 1. In resynchronization processing at step S210 in FIG. 5, first the header information processor 1 compares the number of restart markers already acquired up to detection of code error with the total number of restart markers contained in the encoded data stream (step S501). If the result of the comparison is that the number or restart markers already acquired is not less than the total number of restart markers contained in the encoded data stream ("NO" at step S501), i.e., if all of the restart markers have already appeared, then the header information processor 1 immediately executes processing for ejecting the compensation data (step S512) and terminates resync processing.

On the other hand, if the number or restart markers already acquired is found to be less than the total number of restart markers contained in the encoded data stream ("YES" at step S501), i.e., if presence of a restart marker in the encoded data stream can still be expected, control proceeds to step S502. Here it is determined whether the code-amount count value is greater than zero. If the result of the determination is that the code-amount count value is equal to or less than zero ("NO" at step S502), then the header information processor 1 immediately executes processing for discharging the compensation data (step S512) and terminates resync processing.

In resync processing, the header information processor 1 acquires one byte of encoded data (step S503) from the variable-length code decoder 2 via the encoded-data output signal 7 if it can be expected that a restart marker exists in the encoded data stream and, moreover, the code-amount count value is greater than zero ("YES" at step S502). The header information processor 1 then decrements the code-amount count value to thereby count the amount of unprocessed code in the encoded data stream (step S504). In the case of JPEG encoding, for example, all markers start from one-byte data, which is "0xFF", a hexadecimal number. Accordingly, the header information processor 1 determines whether one byte of encoded data that has been acquired is "0xFF" (step S505). If it is different encoded data ("NO" at step S505), control returns to step S502 and acquisition of encoded data from the variable-length code decoder 2 is continued until the encoded data that is "0xFF" appears.

On the other hand, if one byte of encoded data that is "0xFF" appears ("YES" at step S505), then the header information processor 1 acquires the next byte (step S506) and determines whether this is a restart marker based upon the value thereof. In the case of JPEG encoding, if variable-length code "0xFF" appears at a byte boundary, it is possible to distinguish this marker by inserting "0x00" immediately after it. Accordingly, it is determined whether the byte acquired following "0xFF" is "0x00" (step S507). If the result is that this one byte is "0x00" ("YES" at step S507), control returns to step S502 on the grounds that this is not a marker and the operation for finding "0xFF" from the encoded data stream again is repeated.

On the other hand, if the byte acquired following "0xFF" is not "0x00" ("NO" at step S507), it is determined that this is a restart marker (step S508). In the case of JPEG encoding, a restart marker takes on the eight values of "0xFFD0" to "0xFFD7" in order. Accordingly, if the value has progressed to "0xFFD7", the next value to be taken on will be "0xFFD0" and the values will repeat in the same order. If the restart marker that appears immediately before a code error is detected is "0xFFD2", then the restart marker that should appear next is "0xFFD3".

Whether a restart marker will appear once a code error has been detected depends upon the extent of damage sustained by the encoded data stream and cannot be predicted. However, if any restart marker appears ("YES" at step S508), processing for ejecting the compensation data is executed immediately (step S509). In processing for ejecting compensation data, control returns to processing A for decoding variable-length code following ejection of compensation data in an amount equivalent to the loss, which is estimated from the difference between the value of the restart marker that appeared immediately prior to detection of a code error and the value of the restart marker that appeared during the search for the restart marker.

If control returns to processing A for decoding variable-length code upon completion of resync processing at step S210, the header information processor 1 again instructs the variable-length code decoder 2, via the operation-start command signal 3, to start execution of processing B for decoding variable-length code (step S211). If a code error is detected again thereafter, the header information processor 1 repeats the above-described processing. If a code error is not detected again, then the header information processor 1 determines, based upon whether the operation-end notification signal 4 has been received, whether the variable-length code decoder 2 has completed processing B for decoding variable-length code with regard to the entire encoded data stream (step S212). If the result of the determination is that the operation-end notification signal 4 has been received ("YES" at step S212), then the header information processor 1 exits processing A for decoding variable-length code and terminates all processing.

If a marker that is not a restart marker appears ("NO" at step S508) in the resync processing, it is considered that this is an invalid marker that has been generated owing to damage sustained by the encoded data stream. Accordingly, the header information processor 1 increments the invalid-marker count value, thereby counting the number of invalid markers that have appeared (step S510). The header information processor 1 now determines whether the count of invalid markers is greater than a preset threshold value T2 (step S511). If the result of the determination is that the count of invalid markers is not greater than a preset threshold value T2 ("NO" at step S511), then the header information processor 1 returns control to step S502 and repeats the operation for finding "0xFF" from the encoded data stream. On the other hand, if the count of invalid markers is greater than a preset threshold value T2 ("YES" at step S511), then the header information processor 1 immediately executes processing for ejecting the compensation data (step S512).

The fact that the count of invalid markers takes on a large value reflects the fact that the degree of damage sustained by the encoded data stream is large. That is, with regard to an encoded data stream that has sustained so much damage that the count of invalid markers takes on a large value, it can be predicted that the probability that a normal restart marker will appear again will be low even if a search for the restart marker is continued in the hope that it will reappear following the detection of code error. Furthermore, in a case where the search for this restart marker is conducted using the header information processor 1, which is constituted by a general-purpose microprocessor that operates in accordance with program code, the processing time is extremely long and user convenience suffers as a result. Accordingly, an appropriate value is set for the threshold value T2. If the count of invalid markers exceeds this threshold value, processing for ejecting compensation data is executed immediately without conducting a further search for restart markers. This is a highly logical decision that takes user convenience into consideration.

The above embodiment of the present invention has been described in application to processing for decoding a still image based upon the JPEG encoding standard. However, the present invention is similarly applicable also to processing for decoding moving images based upon the MPEG encoding standard.

Specifically, the present invention provides an image processing apparatus having header information processing means (e.g., the header information processor 1) for analyzing header information in an entered encoded data stream; decoding means (e.g., the variable-length code decoder 2) for decoding image information of the encoded data stream; and reconstructing means (e.g., the image data reconstruction unit 10) for reconstructing image data based upon result of analysis of the header information and the image information that has been decoded; characterized by comprising decision means for deciding correction data, which is for correcting the encoded data stream, based upon number of code errors contained in the entered encoded data stream; and correction means for correcting the encoded data stream using the correction data.

Further, the present invention provides an image processing apparatus having header information processing means (e.g., the header information processor 1) for analyzing header information in an entered encoded data stream block by block thereof, wherein the data stream is obtained by dividing encoded image data into a plurality of blocks; decoding means (e.g., the variable-length code decoder 2) for successively decoding image information, which comprises a plurality of successive variable-length codes of the encoded data stream, thereby obtaining a series of frequency transform coefficient sequences; and reconstructing means (e.g., the image data reconstruction unit 10) for reconstructing image data based upon encoding parameters and the series of frequency transform coefficient sequences; characterized by comprising detection means for detecting code errors contained in the encoded data stream of an entered block; counting means for counting the number of code errors detected; search means for searching for resync identifiers contained in the encoded data stream; and correction means which, if the number of code errors detected is equal or less than a predetermined number and, moreover, a code error is contained in a portion of the data stream that lies between two resync identifiers that have been found, corrects this portion of the data stream by a correction data stream, and if the number of code errors detected is greater than the predetermined number, corrects the encoded data stream of the block by a correction data stream having a size the same as that of the block.

Furthermore, according to the present invention, the correction means includes generating means for generating a predetermined frequency transform coefficient sequence as a correction data stream for correcting an encoded data stream that contains a code error; and ejection means for ejecting the frequency transform coefficient sequence that has been generated.

Furthermore, according to the present invention, the apparatus further comprises second counting means for counting the number of invalid resync identifiers found from the encoded data stream. If the number of invalid resync identifiers counted is greater than a predetermined value, the correction means corrects the encoded data stream using correction data.

Furthermore, according to the present invention, the apparatus further comprises detection notification means for notifying the header information processing means (e.g., the header information processor 1) of the fact that a code error has been detected in the encoded data stream. Furthermore, according to the present invention, the apparatus further comprises command means by which the header information processing means (e.g., the header information processor 1) instructs the decoding means (e.g., the variable-length code decoder 2) to start executing decoding processing; and end-notification means by which the decoding means notifies the header information processing means of the fact that execution of decoding processing has ended.

Thus, in accordance with the image processing apparatus according to the present invention, processing for ejecting compensation data is executed immediately, without performing a further search for restart markers, if, in processing for decoding an encoded data stream, the counted number of code errors exceeds the threshold value T1 set to an appropriate value or the counted number of invalid markers exceeds the threshold value T2 set to an appropriate value. As a result, the processing needed to decode a still image or moving image, regardless of the amount of error it contains, can be completed within a period of time that will not detract from user convenience. Another advantage is that a reconstructed image that most closely matches the original image can be obtained within this period of time.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium (or recording medium) storing the program codes of the software for performing the functions of the foregoing embodiment to a system or an apparatus, reading the program codes with a computer (e.g., a CPU or MPU) of the system or apparatus from the storage medium, and then executing the program codes. In this case, the program codes read from the storage medium implement the novel functions of the embodiment, and the storage medium storing the program codes constitutes the invention. Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire process in accordance with the designation of program codes and implements the function of the above embodiment.

Thus, in accordance with the present invention, as described above, it is possible to execute decoding of a compressed image appropriately, in a processing time needed for decoding that will not detract from user convenience, in conformity with amount of code error contained in the image.

The present invention is not limited to the above embodiments and various changes and modifications can be made within the spirit and scope of the present invention. Therefore, to apprise the public of the scope of the present invention, the following claims are made.

What is claimed is:

1. An image processing apparatus comprising:
   header information processing means for analyzing header information in an entered encoded data stream;
   decoding means for successively decoding image information, which comprises a plurality of successive variable-length codes of the encoded data stream, thereby obtaining a series of frequency transform coefficient sequences;
   reconstructing means for reconstructing image data based upon encoding parameters and the series of frequency transform coefficient sequences;
   detection means for detecting code errors contained in the encoded data stream of an entered block;
   counting means for counting the number of code errors detected;
   search means for searching for resync identifiers contained in the encoded data stream; and
   correction means which, if the number of code errors detected is equal to or less than a predetermined number and a code error is contained in a portion of the data stream that lies between two resync identifiers that have been found, corrects this portion of the data stream by a correction data stream, and if the number of code errors detected is greater than the predetermined number, corrects the encoded data stream by a correction data stream having a size the same as that of reconstructing entire image.

2. The apparatus according to claim 1, wherein said correction means includes:
   generating means for generating a predetermined frequency transform coefficient sequence as a correction data stream for correcting an encoded data stream that contains a code error; and
   ejection means for ejecting the frequency transform coefficient sequence that has been generated.

3. The apparatus according to claim 1, further comprising second counting means for counting the number of invalid resync identifiers found from the encoded data streams,
   wherein if the number of invalid resync identifiers counted is greater than a predetermined value, said correction means corrects the encoded data stream using correction data.

4. The apparatus according to claim 1, further comprising detection notification means for notifying said header information processing means of the fact that a code error has been detected in the encoded data stream.

5. The apparatus according to claim 1, further comprising:
   command means by which said header information processing means instructs said decoding means to start executing decoding processing; and
   end-notification means by which said decoding means notifies said header information processing means of the fact that execution of decoding processing has ended.

6. A method of controlling an image processing apparatus having header information processing means for analyzing header information in an entered encoded data stream, decoding means for successively decoding image information, which comprises a plurality of successive variable-length codes of the encoded data stream, thereby obtaining a series of frequency transform coefficient sequences, and reconstructing means for reconstructing image data based upon encoding parameters and the series of frequency transform coefficient sequences, said method comprising;
   a detection step of detecting code errors contained in the encoded data stream of an entered block;
   a counting step of counting the number of code errors detected;
   a search step of searching for resync identifiers contained in the encoded data stream; and
   a correction step which, if the number of code errors detected is equal to or less than a predetermined number and a code error is contained in a portion of the data stream that lies between two resync identifiers that have been found, said correction step includes correcting this portion of the data stream by a correction data stream, and if the number of code errors
   detected is greater than the predetermined number, is a step of correcting the encoded data stream by a correction data stream having a size the same as that of reconstructing entire image.

7. The method according to claim 6, wherein said correction step includes:
   a generating step of generating a predetermined frequency transform coefficient sequence as a correction data stream for correcting an encoded data stream that contains a code error; and
   an ejection step of ejecting the frequency transform coefficient sequence that has been generated.

8. The method according to claim 6, further comprising a second counting step of counting the number of invalid resync identifiers found from the encoded data stream,
   wherein if the number of invalid resync identifiers counted is greater than a predetermined value, said correction step includes correcting the encoded data stream using correction data.

9. The method according to claim 6, further comprising a detection notification step of notifying said header information processing means of the fact that a code error has been detected in the encoded data stream.

10. The method according to claim 6, further comprising:
    a command step of causing said header information processing means to instruct said decoding means to start executing decoding processing; and
    an end-notification step of causing said decoding means to notify said header information processing means of the fact that execution of decoding processing has ended.

11. A computer-readable medium encoded with a computer program for controlling an image processing apparatus having header information processing means for analyzing header information in an entered encoded data stream, decoding means for successively decoding image information, which comprises a plurality of successive variable-length codes of the encoded data stream, thereby obtaining a series of frequency transform coefficient sequences, and reconstructing means for reconstructing image data based upon encoding parameters and the series of frequency transform coefficient sequences, said computer program functioning as:
  detection means for detecting code errors contained in the encoded data stream of an entered block;
  counting means for counting the number of code errors detected;
  search means for searching for resync identifiers contained in the encoded data stream; and
  correction means which, if the number of code errors detected is equal or less than a predetermined number and a code error is contained in a portion of the data stream that lies between two resync identifiers that have been found, corrects this portion of the data stream by a correction data stream, and if the number of code errors detected is greater than the predetermined number, corrects the encoded data stream by a correction data stream having a size the same as that of reconstructing entire image.

* * * * *

UNITED STATES PATENT AND TRADEMARK OFFICE
CERTIFICATE OF CORRECTION

PATENT NO. : 7,155,063 B2
APPLICATION NO. : 10/369544
DATED : December 26, 2006
INVENTOR(S) : Yokio Chiba Page 1 of 1

It is certified that error appears in the above-identified patent and that said Letters Patent is hereby corrected as shown below:

COLUMN 3:

Line 40 "flow chart" should read --a flow chart--

COLUMN 6:

Line 32 "s08)" should read --s208)--

COLUMN 11:

Line 55 Claim 3 "streams," should read --"stream,"--

COLUMN 12:

Line 12 Claim 6 "comprising;" should read --comprising:--

Signed and Sealed this

Fifth Day of August, 2008

JON W. DUDAS
*Director of the United States Patent and Trademark Office*